(12) United States Patent
Pasini Bertran

(10) Patent No.: US 8,409,650 B2
(45) Date of Patent: Apr. 2, 2013

(54) PROCEDURE AND SHAPING DEVICE FOR PRODUCING THREE-DIMENSIONAL CANDIES

(76) Inventor: Pedro Pasini Bertran, Estado de Mexico (MX)

( * ) Notice: Subject to any disclaimer, the term of this patent is extended or adjusted under 35 U.S.C. 154(b) by 214 days.

(21) Appl. No.: 12/704,160

(22) Filed: Feb. 11, 2010

(65) Prior Publication Data

US 2010/0209569 A1 Aug. 19, 2010

(30) Foreign Application Priority Data

Feb. 12, 2009 (MX) .................. MX/A/2009/001612

(51) Int. Cl.
*A23L 1/0562* (2006.01)
(52) U.S. Cl. ........ 426/575; 426/104; 426/576; 426/577; 426/578; 426/515; 426/520
(58) Field of Classification Search .......... 426/249, 426/573–578, 660, 661, 393, 512, 520, 515, 426/524, 103, 104
See application file for complete search history.

(56) References Cited

U.S. PATENT DOCUMENTS

| | | | | |
|---|---|---|---|---|
| 3,218,177 A | * | 11/1965 | Robinson et al. | 426/578 |
| 3,582,349 A | * | 6/1971 | Rasmusson | 426/293 |
| 3,857,330 A | * | 12/1974 | Ruckstaetter | 99/354 |
| 3,892,871 A | * | 7/1975 | Cooper | 426/573 |
| 4,704,293 A | * | 11/1987 | Moore et al. | 426/573 |
| 4,744,997 A | * | 5/1988 | Hoffmann et al. | 426/576 |
| 4,746,523 A | * | 5/1988 | Binley | 426/249 |
| 4,882,176 A | * | 11/1989 | Koyama et al. | 426/5 |
| 4,913,924 A | * | 4/1990 | Moore | 426/578 |
| 4,988,531 A | * | 1/1991 | Moore et al. | 426/578 |
| 5,242,291 A | * | 9/1993 | Farmakis | 425/215 |
| 6,419,979 B1 | * | 7/2002 | Nelson et al. | 426/660 |
| 6,596,334 B1 | * | 7/2003 | Flickinger et al. | 426/573 |
| 2001/0036499 A1 | * | 11/2001 | Ong et al. | 426/573 |
| 2004/0071831 A1 | * | 4/2004 | Barba | 426/91 |
| 2004/0159974 A1 | * | 8/2004 | Fischer | 264/219 |
| 2006/0147610 A1 | * | 7/2006 | Gofers et al. | 426/660 |
| 2006/0286284 A1 | * | 12/2006 | Mistry et al. | 426/660 |
| 2007/0264415 A1 | * | 11/2007 | Axelrod et al. | 426/623 |
| 2009/0068333 A1 | * | 3/2009 | Muller et al. | 426/515 |
| 2010/0266744 A1 | * | 10/2010 | Dwivedi | 426/576 |

* cited by examiner

*Primary Examiner* — Drew E Becker
(74) *Attorney, Agent, or Firm* — Alfred M. Walker

(57) ABSTRACT

The present invention relates to an innovative procedure for producing three-dimensional candies, preferably of the type known in the food industry as gummy snacks, which eliminates the stamping of starch beds and the cleaning process of the chilled product, furthermore having control of detail on all sides of the product, as well as a transparency and crystallinity never before achieved with the procedures known and traditionally used in the food industry. Likewise, the invention incorporates a completely novel shaping device consisting of two plates connected by a male-female system and with a plurality of product-shaping cavities that are in contact with all sides of the product to be formed.

22 Claims, 4 Drawing Sheets

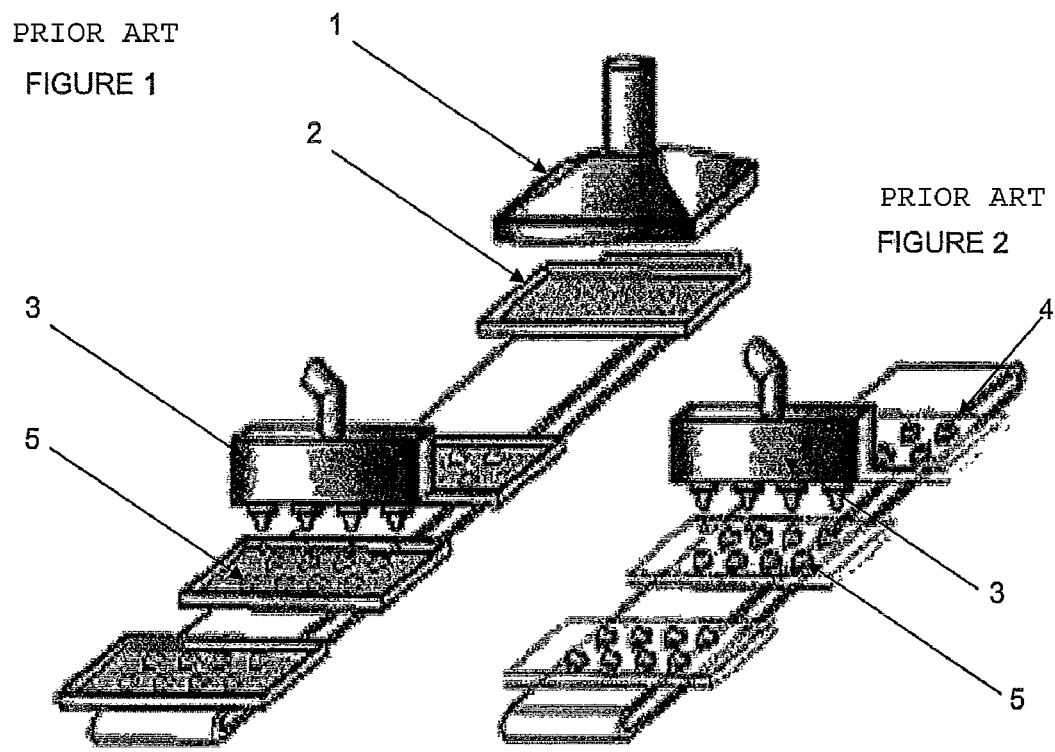
PRIOR ART
FIGURE 1
PRIOR ART
FIGURE 2
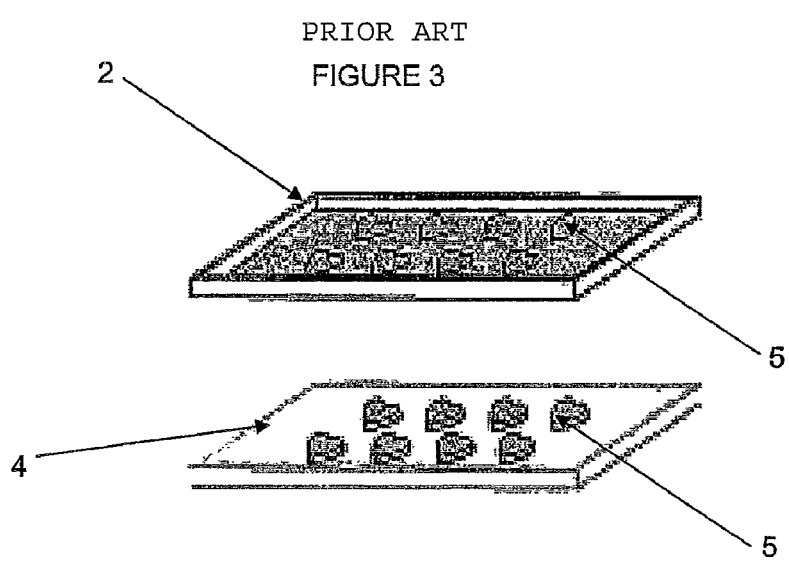
PRIOR ART
FIGURE 3

PROCEDURE AND SHAPING DEVICE FOR PRODUCING THREE-DIMENSIONAL CANDIES

BACKGROUND OF THE INVENTION

Processes for manufacturing sweets, including those known as gummy snacks (hereinafter the term gummy snacks also refers to gelatin gummies), are known in the food industry; however, none of the existing procedures allow for the production of three-dimensional gummy snacks in which all of their sides are configured.

Likewise, the majority of the conventional processes use starch beds as molds that are stamped to form cavities with the shapes of the gummy snacks that are desired; nevertheless, these shapes are not perfect because the material used does not allow any detail in the formation of the cavities. Once stamped, these starch beds are filled with hot syrups made with water, sugar, glucose or fructose, gelatin, flavoring agents, dyes and preservatives. After filling, the beds are placed in refrigeration chambers or freezers to harden. The gummy snacks are then removed from the molds and must undergo a cleaning procedure to remove the starch that has adhered to them.

There are processes for producing gummy snacks in which molds made of polycarbonate or plastic derivatives are used instead of starch beds; however, they are used on the market infrequently due to their high costs and it is not possible to obtain three-dimensional gummy snacks with a controlled configuration of all sides.

Therefore, there is a need to develop an efficient technology to produce gummy snacks that eliminates the disadvantages of the known procedures and furthermore makes it possible to obtain three-dimensional gummy snacks with a configuration of all sides.

SUMMARY OF THE INVENTION

Consequently, an object of the present invention is to provide a procedure by means of which three-dimensional gummy snacks are obtained and the disadvantages of the known processes are eliminated in which at least one of the sides of the gummy snacks is flat and corresponds to the part of the gummy snack that is not in contact with the cavity of the mold where the product is configured.

In a preferred embodiment of the present invention, the starch beds are eliminated and with that the stamping and the cleaning procedure for the demolded product.

Likewise, the present invention provides novel shaping devices for producing three-dimensional gummy snacks, which devices make it possible to obtain gummy snacks with highly detailed shapes and are easily demolded.

The present invention also makes it possible to obtain gummy snacks whose three-dimensional shape is controlled on all sides by means of novel shaping devices that make it possible to print said sides with a high level of detail in order to obtain perfect three-dimensional shapes without defects or junction or cut lines on the shape that is being reproduced.

With the procedure of the present invention, a novel product is obtained with a transparency and crystallinity that is completely innovative in the food industry.

BRIEF DESCRIPTION OF THE DRAWINGS

These and other objects of the present invention, as well as its characteristic details, will become evident from the following detailed description and the drawings that accompany it in an illustrative and non-limiting manner, wherein:

FIG. 1 is a perspective view that illustrates part of a conventional process for producing gummy snacks utilizing starch beds.

FIG. 2 is a perspective view that illustrates part of a conventional process for producing gummy snacks utilizing polycarbonate molds.

FIG. 3, are perspective views that show in detail the cavities of the starch bed and polycarbonate mold of the prior art's procedures.

DETAILED DESCRIPTION OF THE INVENTION

With regard to the Figures, wherein the same numerical references have been used to designate similar parts, a preferred embodiment of the procedure of the present invention is described below, consisting of preparing a syrup by mixing 12%-56% of sugars; 14%-65% of glucose or fructose; and 14%-53% of water. Heat the syrup to a temperature of 100-160° C., depending on the desired hardness and viscosity, and add 4%-72% of a gelling agents such as agar-agar, carrageenans, gelatin, pectin or modified starches; 0.23%-5.5% of sodium citrate; dyes; flavoring agents; preservatives; titanium dioxides; and acids such as, for example, citric acid, lactic acid, malic acid, fumaric acid and sorbic acid. The quantities will vary depending on the hardness, consistency, flavor and color that is desired in the finished product and the gelling agent can be hydrated beforehand to facilitate its dissolution.

Once the mixture is obtained, and keeping the temperature between 100-160° C. and preferably between 130-135° C., it is deposited in injectors 3 and 3A to be injected into the shaping devices of the present invention. In the traditional procedures, the injection is done into molds comprising cavities 5 formed by stamping a starch bed (corn starch) 2 with a stamping machine 1 as shown in FIG. 1 or into polycarbonate molds as illustrated in FIG. 2.

Figure 4:
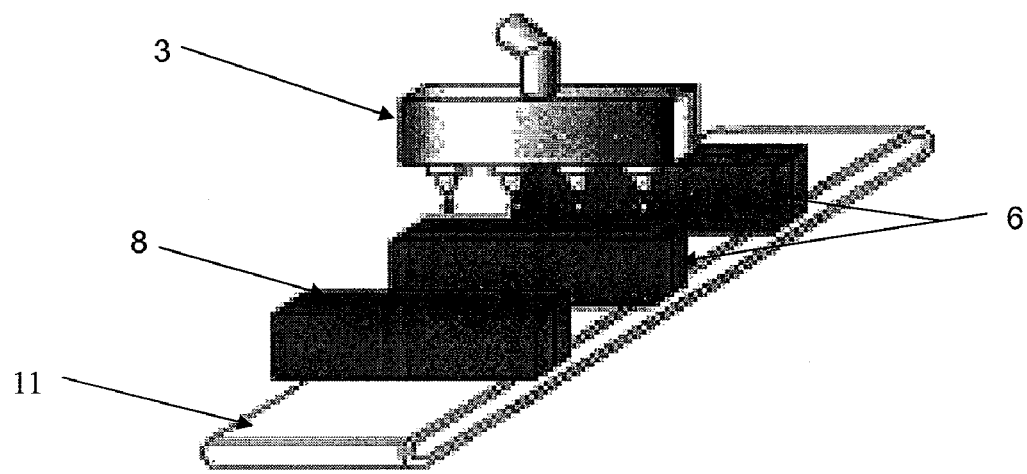
FIG. 4 is a perspective view that illustrates part of the novel procedure of the present invention.
Figure 5:
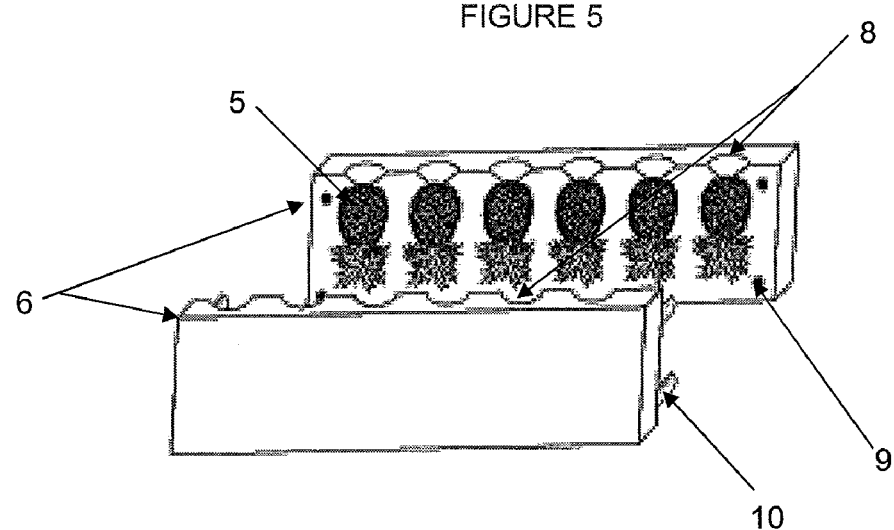
FIG. 5 is a perspective view of the novel shaping device of the present invention.
Figure 6:
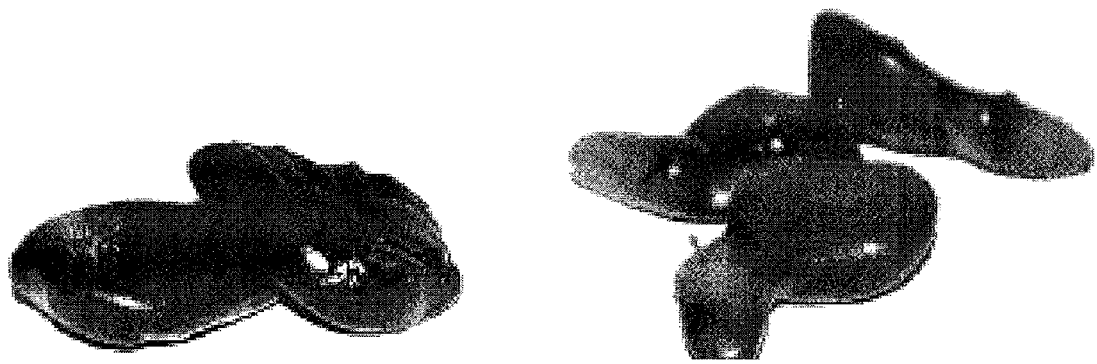
FIG. 6 illustrates examples of products (gummy snacks) obtained by conventional methods.
Figure 7:
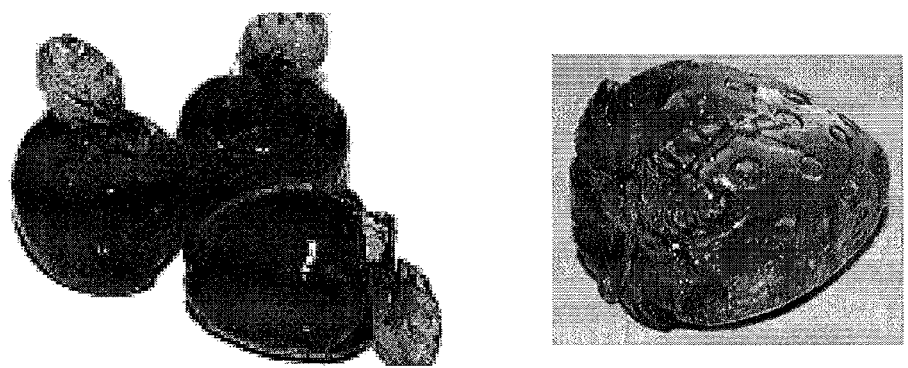
FIG. 7 illustrates non-limiting examples of products obtained with the procedure and shaping device of the present invention.
Figure 8:
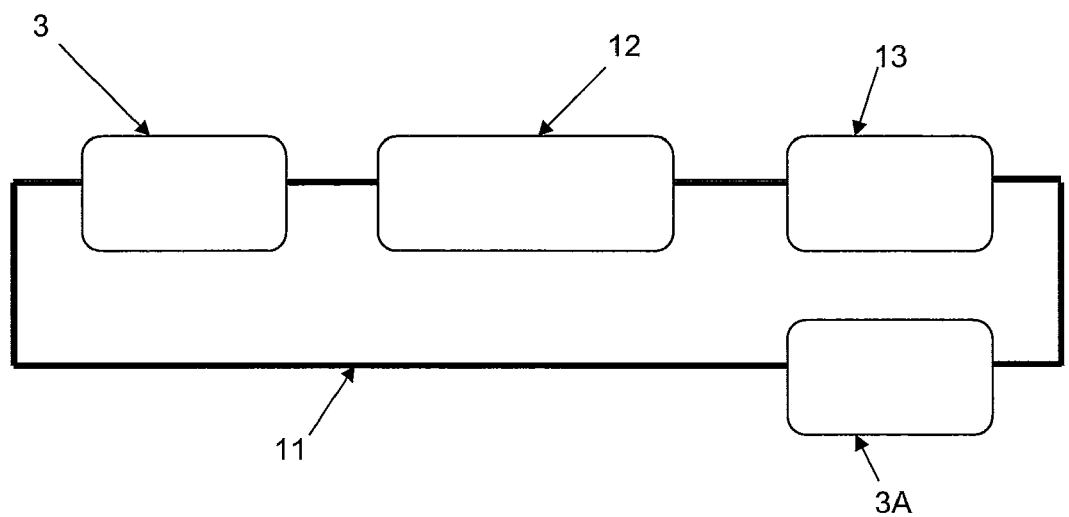
FIG. 8 shows a diagram of the procedure of the present invention.

In the procedure of the present invention, the mixture is deposited into a plurality of completely innovative shaping systems, each comprising two plates 6 and 6' made of materials selected from silicones, rubbers, plastics and their derivatives, metal alloys, porcelains and the like. These materials are mentioned by way of non-limiting example, since it will be evident to an expert in the field that other materials can be used without departing from the scope of the invention. Both plates 6 and 6' are joined by means of a male-female type of connection by the introduction of the projections 10 of one of the plates 6, into the holes 9 placed in the plate 6', as is evident in FIG. 5. Each plate 6 and 6' has a cavity 5 with the shape of the desired product in such a way that the cavities 5 of both plates 6 and 6' complement each other to configure the final product. The materials used in the manufacture of the plates 6 and 6' permit a detailed reproduction of the required shapes in the finished product as well as the ability to obtain three-dimensional shapes with perfect control over the entire form, such as defining different shapes and colors, for example, for sheets in the forms of fruits such as apples, strawberries, pears, etc., which are characteristics that are not achieved with the traditional procedures.

The plates 6 and 6' of the present invention have rabbets 8 that form, when both plates 6 and 6' are joined, product entry holes and ventilation or air escape holes. Likewise, the male-female connection of the plates 6 and 6' makes demolding the finished product easier, faster and more hygienic than the already known procedures.

The shaping devices are placed on a conveyor belt 11 and are passed by the injectors 3 and 3A that fill the cavities 5 with the mixture that is prepared depending on the desired product and, once full, are passed through cooling tunnels 12 at a temperature preferably from −18 to −25° C. for 10-12 minutes or are placed in refrigeration chambers and/or freezers for 6-24 hours.

Once the product has hardened or chilled, the gummy snacks are demolded in the demolding unit 13 and are placed on pins for their final stabilization and then packaged without requiring the cleaning process conducted with the procedures known to date. On this same unit 13, the plates 6 and 6' of the shaping devices are separated and are reconnected in order to be re-injected.

In a preferred embodiment of the invention, the injectors 3 inject the mixture with one color, whereas the injectors 3A inject the mixture of a different color, with a time of 10-20 seconds, and preferably 15 seconds, existing between the injection of the two colors.

Thus, the procedure and shaping devices of the present invention make it possible to obtain gummy snacks at reduced costs due to the elimination of both the starch bed stamping as well as the cleaning process to eliminate starch adhered to the product of the already known processes.

Another advantage of the present invention is the ability to obtain completely innovative pieces in a third dimension with detailed control of all sides, as well as a transparency and crystallinity never before achieved by means of the traditional procedures.

The present invention has been described with regard to a preferred embodiment; however, it will be evident to experts in the field that other types of food products different from those known as gummy snacks can be produced without departing from the spirit and scope of the invention.

Having sufficiently described my invention, I consider it to be a novelty and as such claim as my exclusive property the content in the following clauses:

1. A method for the production of crystalline three-dimensional gummy snacks, wherein the gummy snacks are gelatin gummies, and a syrup is prepared with water, sugars and fructose or glucose, the method comprising the steps of:
   mixing 12%-56% of sugar, 14%-65% of glucose or fructose and 14%-53% of water forming a syrup;
   then heating the syrup to a temperature between 100-160 deg. C.;
   then adding 4%-72% of a gelling agent and 0.23%-5.5% of sodium citrate to the heated syrup, wherein the gelling agent is hydrated gelatin;
   adding dyes, flavoring agents, preservatives, titanium dioxides and acids;
   maintaining the temperature between 100-160 deg. C.;
   injecting the mixture into shaping devices;
   passing the full shaping devices through cooling tunnels for chilling;
   demolding the chilled and hardened product;
   placing the demolded product on pins for its final stabilization; and
   packaging the product without a cleaning process.

2. The method according to claim 1, wherein the acid is selected from among citric acid, lactic acid, fumaric acid, malic acid and sorbic acid.

3. The method according to claim 2, wherein the temperature of the mixture is preferably in the range of 130-135° C.

4. The method according to claim 3, further comprising selecting the temperature based on the desired hardness and viscosity in the finished product.

5. The method according to claim 1, further comprising selecting the quantities of ingredients based on the hardness, consistency, flavor and color that is desired in the finished product.

6. The method according to claim 1, wherein the temperature in the cooling tunnels is −18 to −25° C.

7. The method according to claim 6, wherein the temperature in the cooling tunnels is about −20° C.

8. The method according to claim 7, wherein the time that the full shaping devices remain in the cooling tunnels is 12-14 minutes.

9. The method according to claim 8, wherein the shaping devices that exit the cooling tunnels are transported to a demolding unit in which the chilled product is demolded.

10. The method according to claim 1, wherein the shaping devices are plates joined by means of a male-female system that facilitates demolding of the finished product.

11. The method according to claim 10, wherein each plate has a plurality of cavities with the shape of the desired product, such that the cavities of both parts complement each other to configure the final product.

12. The method according to claim 11, wherein the full plates are separated in the demolding unit and are reconnected once they are empty in said unit.

13. The method according to claim 12, wherein the plates are made of materials that allow a detailed reproduction of the required shapes in the finished product, as well as the ability to obtain three-dimensional shapes with total control over the entire form.

14. The method according to claim 13, wherein the materials of the plates are selected from silicones, plastics and their derivatives, rubbers and porcelains.

15. The method according to claim 14, wherein the plates have rabbets that form product entry holes and ventilation or air escape holes when both plates are connected together.

16. The method according to claim 1, wherein the injection of the mixture is injected from two different injection units.

17. The method according to claim 16, wherein the mixture with one color is injected on each injection unit.

18. The method according to claim 17, wherein the time between the injection of the two colors is 15 seconds.

19. The method according to claim 17, wherein the time between both injections is 10-20 seconds.

20. The method according to claim 1, wherein the demolding step of the chilled product is done by separating the plates.

21. The method of claim 1, further comprising the step of adding carrageenan, pectin, agar-agar and modified starches to said gelling agent.

22. A method for the production of crystalline three-dimensional gummy snacks, wherein the gummy snacks are gelatin gummies, and a syrup is prepared with water, sugars and fructose or glucose, the method consisting of the steps:
   mixing sugar, glucose or fructose and water forming a syrup;
   then heating the syrup to a temperature between 100-160 deg. C.;
   then adding a gelling agent and sodium citrate to the heated syrup, wherein the gelling agent is hydrated gelatin;

adding dyes, flavoring agents, preservatives, titanium dioxides and acids;
maintaining the temperature between 100-160 deg. C.;
injecting the mixture into shaping devices;
passing the full shaping devices through cooling tunnels for chilling; demolding the chilled and hardened product;

placing the demolded product on pins for its final stabilization; and, packaging the product without a cleaning process.

* * * * *